United States Patent Office 3,650,971
Patented Mar. 21, 1972

3,650,971
COMPOSITION FOR PLASTICIZING RUBBER
Richard S. Tobey, Wilmington, Del., assignor to E. I. du Pont de Nemours and Company, Wilmington, Del.
No Drawing. Filed June 26, 1970, Ser. No. 50,356
Int. Cl. C09k 3/00
U.S. Cl. 252—182
8 Claims

ABSTRACT OF THE DISCLOSURE

A composition useful for plasticizing or peptizing rubber; it is in the form of easy-to-use pourable solid particles, and it is substantially free of unpleasant mercaptan odor. The composition is comprised of particles of hydrated silica or calcium silicate of certain particle size and surface area to which is attached a specified amount of xylyl mercaptan; and preferably the composition also contains uniformly dispersed iron phthalocyanine and clay, plus a suitable liquid such as kerosene.

BACKGROUND OF THE INVENTION

This invention relates to a composition and a process for plasticizing rubber.

It is known in the art that certain rubber plasticizing agents (plasticizers) are sometimes called peptizers. In working the rubber, a peptizer is often added to prevent deterioration of the rubber from overmilling, to permit milling with less time and power or to provide a softer more workable, or more soluble rubber—a rubber that can be readily or easily processed in steps subsequent to initial milling.

There is a need in the rubber industry for a better peptizer for use in rubber compositions based on natural rubber or a synthetic rubber such as polybutadiene, polyisoprene, butadiene-styrene copolymer, butadiene-acrylonitrile copolymer, or the like. Peptizers containing mercaptan compounds have been used in such compositions, but those having the best plasticizing ability in many applications (liquid mercaptan compounds) have generally been in the form of liquids or pastes which have a very strong unpleasant odor and are difficult to handle and use. It is often difficult to obtain reproducible results due to problems in regulating the rate and amount of plasticizing. What is needed is a substance having not only the ability to function effectively in plasticizing or peptizing the rubber composition, but also having little or no unpleasant odor and having a form that makes handling and use easy (e.g. easy-to-pour solid particles capable of providing a particular desired amount of plasticizing in a particular mixing time).

SUMMARY OF THE INVENTION

Expressed broadly, the present invention provides a pourable particulate composition useful for plasticizing or peptizing rubber comprising (A) fine particles of a substance selected from the group: hydrated silica and hydrated calcium silicate, said particles having an average diameter of about 0.005–2.5 microns and a surface area of about 40–400 square meters per gram, and (B) xylyl mercaptan attached to said particles, the weight ratio of component B to component A being about 35:65 to 70:30, said composition being substantially free of mercaptan odor.

The invention also provides a process for plasticizing or peptizing rubber which comprises intimately mixing into the rubber about 0.1–3.0% of the composition described in the previous paragraph based on the weight of the rubber. In addition, it provides a readily processable rubber composition obtained by said process.

DESCRIPTION OF PREFERRED EMBODIMENTS

Preferred embodiments of the composition contain, in a substantially uniform state of dispersion, another substance (component C) in an amount equal to about 0.1–2.0% of iron phthalocyanine based on the combined weight of components A, B and C. A component C content of about 1.0–1.7% (based on the total weight of A, B, and C) is especially preferred. Preferably all of the particles of component A will pass through a 100 mesh screen and about 90–100% by weight of them will pass through a 300 mesh screen. It is also often preferred that any other component of solid particles present in the composition have these same properties.

At normal room temperatures (e.g. about 15–27° C.), component B is a liquid and component C is a solid. Some of the best embodiments of the composition contain component C in the form of particles having an average diameter of about 0.75–1.25 microns. However, finer particles are also quite useful, and coarser particles can also be used. Component C can be first uniformly mixed with a quantity of finely divided solid particles suitable as a diluent for component C to facilitate providing exactly the desired amount of component C in the composition. For example, the powder diluent can be clay and/or a portion of component A or another particulate substance suitable for addition to rubber compositions (e.g. as a filler or pigment). A ball mill or an air mill of the type known to be useful for grinding or dispersing pigments can be used to preblend component C with the powder diluent. It has been found that some of the most useful embodiments of the novel peptizer contain about 1–15%, preferably about 5–12%, of clay (rubber filler grade) based on the total weight of the composition; and the clay is preferably added as described above by first blending it uniformly with component C.

It is also often preferred to have present in the composition in a substantially uniform state of dispersion, a substance which can be referred to as component D; component D consists of an inert liquid diluent which is miscible with component B, and undergoes no harmful reaction with components A, B and C, the weight ratio of component D to component B being about 5:95 to 40:60. A component D liquid is selected which also undergoes no harmful reaction with any other ingredient of the plasticizer composition or with the rubber into which it will be mixed. Thus, component D is inert in the sense that it will not undergo any harmful reaction with any other ingredient under the conditions of preparing and using the plasticizer. One very useful component D liquid is kerosene; another is a light petroleum oil type of rubber-processing oil (e.g. "Circo Oil" from the Sun Oil Company). Another is an aliphatic hydrocarbon which evaporates faster than kerosene under rubber milling conditions, for example, naphtha or mineral spirits.

The composition is composed of particles which can be poured from their container. In preferred embodiments the particles have excellent pouring characteristics, making it very easy to handle them during packaging and during use in the manufacture of rubber products.

The component B mercaptan is attached to the component A particles; it can be in absorbed or adsorbed relationship with the particles, or otherwise in clinging contact with them as a result of being intimately mixed with them. Some embodiments of the composition also have the optional components in clinging contact with component A particles.

The process of the invention is carried out by intimately mixing about 0.1–3.0% (preferably about 0.2–0.4% in the case of natural rubber) of the novel peptizer into any rubber in need of peptizing that is compatible with the peptizer. The peptizing is done at an elevated temperature capable of causing the active ingredients of the peptizer to function as a plasticizer for the rubber.

Among the types of rubber which are especially useful in this process are natural rubber, polybutadiene, polyisoprene, butadiene-styrene copolymers and butadiene-acrylonitrile copolymers.

The plasticizing or peptizing process is usually carried out at about 65–180° C. in the presence of air or oxygen.

The novel peptizer of pourable solid (nonliquid) particles is highly effective in plasticizing or peptizing various types of rubber. It is capable of functioning well at temperatures and other conditions commonly used in rubber mills and other types of apparatus known to be useful for preparing rubber compositions. Fast and easy processing, and high quality rubber compositions are obtainable by using the present peptizer. Moreover, this peptizer is completely or almost completely free (substantially free) of mercaptan odor. In view of the amount of component B mercaptan present in the composition and the very unpleasant objectionable odor of component B by itself, one skilled in the art experienced with handling mercaptan compounds will find it quite surprising and beneficially useful that this composition is substantially free of unpleasant odor. The composition can be provided in the form of an easy-to-use free-flowing non-dusty powder or granular material with which one can easily obtain a predetermined desired amount of plasticizing in a particular period of mixing or mastication. And the resulting plasticized rubber can be made into useful rubber products by using known rubber curing agents, fillers and other additives, and known mixing and curing methods. The examples which follow are given for the purpose of illustrating the invention. All quantities shown are on a weight basis unless otherwise indicated.

EXAMPLE 1

A peptizer composition of the present invention having the beneficial utility described in the previous paragraph is prepared by (1) placing 10 parts of iron phthalocyanine and 90 parts of clay in an ordinary air mill type of pigment grinding appartus ("Micronizer") to grind component C to the desired particle size and to mix powdered materials, the iron compound being in the form of coarse granules and the clay being a grade of hard clay known to be useful as a filler in rubber compositions ("Suprex Clay" from J. M. Huber Corp., a fine hydrous aluminum silicate clay, about 99.8% by weight of the particles being able to pass through a 325 mesh screen); (2) operating the air mill until a uniform mixture of the iron compound and clay is obtained and the particles of iron compound have an average diameter of about one micron; (3) placing in an ordinary ribbon blender 8.9 parts of the iron compound/clay mixture obtained in step 2 and 27.4 parts of "Micro-Cel" E (from Johns-Manville Corp.), a hydrated calcium silicate which, according to analytical data, has an average particle diameter of about 2.1 microns (about 99–100% by weight of the particles being able to pass through a 325 mesh screen), a surface area of about 95 square meters per gram, a free water content of about 5%, a $SiO_2$ content of 54%, a $CaO$ content of 25%, a content of other metal oxides ($R_2O_3$) of about 6%, and a pH of about 8.4; (4) operating the ribbon blender until a uniform mixture of the hydrated calcium silicate and iron compound/clay composition is obtained; (5) providing a mixture of 30 parts of kerosene and 70 parts of xylyl mercaptan; (6) while operating the ribbon blender and mixing the composition (36.3 parts) of particulate ingredients obtained in step 4, adding gradually (e.g. dropwise or from a sprayer) to the particulate composition 63.7 parts of the kerosene/mercaptan mixture obtained in step 5; and (7) continuing to operate the blender until the resulting peptizer composition is uniformly mixed. A non-dusty composition of free-flowing particles is obtained.

Since the composition contains about 44.6 parts of xylyl mercaptan (component B) and 27.4 parts of hydrated calcium silicate (component A), it has a component B to component A weight ratio of about 62.38. The weight ratio of component D (kerosene) to component B is about 30:70. The composition has a clay content of about 8%. And the component C content (0.89 part of iron compound) is about 1.2% based on the combined weight of components A, B and C. Most of the component B mercaptan is attached to the component A silicate particles.

The resulting particulate peptizer is easy to pour, easy to measure and easy to use by a producer of rubber products who wishes to plasticize the rubber.

The odor characteristics of the peptizer product of Example 1 can be evaluated in a practical manner by (a) allowing the product to age for one week at 25° C.; (b) placing a sample of the product at 25° C. in a four-ounce bottle whose mouth diameter is about two inches, the bottle being about one-half full of the product; and (c) carefully smelling of the sample while holding the mouth of the bottle about one inch below one's nostrils.

The average person skilled in the art finds, on conducting this test, that the product of Example 1 is almost completely free of mercaptan odor; it does not have an unpleasant odor. For all practical purposes, the composition is odorless since it does not have enough odor to present any problem in the normal handling of it. This freedom from unpleasant odor is quite unexpected in view of the very offensive odor of xylyl mercaptan by itself and the fact that the composition has such a high percentage (about 44.6%) of this foul-smelling compound.

EXAMPLE 2

The plasticizing process of the invention is illustrated by (1) providing a Brabender "Plasti-Corder" sigma-blade mixer equipped with means for precise measurement and control of mixer temperature and speed and for measuring the torque which is exerted on the mixing blades in proportion to the viscosity of the material being mixed; (2) using the mixer at a speed of 120 r.p.m. for intimately mixing 0.314 part of the peptizer prepared in Example 1 with 100 parts of natural rubber (smoked sheet) at 121° C. in the presence of air; and (3) recording the torque value after certain periods of mixing time in minutes as shown below in Table I. The torque value (the number of meter-grams of force) decreases as the rubber becomes plasticized.

In the Example 2 process, the rubber is very effectively plasticized by the Example I peptizer, as indicated by the data shown in Table I. It can be seen that the process caused the torque value to drop from 1620 at one minute to 430 after 15 minutes. After the same amount of plasticizing can be obtained in 10 minutes by raising the temperature used in step 2 to about 149° C. Known compounding and curing methods can be employed to manufacture cured rubber products from the plasticized rubber.

EXAMPLE 2A

For purposes of comparison, a process outside the invention is carried out by repeating Example 2 except the peptizer is omitted. As shown in Table I, the torque value is more than double that of Example 2 after 15 minutes.

TABLE I

| Minutes mixed | Example | | | | | | |
|---|---|---|---|---|---|---|---|
| | 2 | 2A | 3 | 4 | 5 | 6 | 7 |
| | Torque Value | | | | | | |
| 1 | 1,620 | 1,900 | 1,650 | 1,820 | 1,790 | 1,800 | 1,820 |
| 2 | 1,315 | 1,780 | 1,340 | 1,680 | 1,650 | 1,675 | 1,685 |
| 5 | 840 | 1,500 | 810 | 1,170 | 1,250 | 1,310 | 1,300 |
| 10 | 560 | 1,170 | 510 | 615 | 740 | 795 | 880 |
| 15 | 430 | 990 | 385 | 395 | 550 | 615 | 750 |

EXAMPLE 3

Another peptizer of this invention having desirable utility and odor characteristics similar to those of the Example 1 product is prepared and mixed with rubber in the manner described in Examples 1 and 2 except: (a) the "Micro-Cel" E is replaced with 31.2 parts of "Hi Sil" 233 (from PPG Industries), a hydrated silica which, according to analytical data, has an average particle diameter of about 0.022 micron (all of the particles passing through a 100 mesh screen and over 92% by weight of them passing through a 300 mesh screen), a surface area of about 150 square meters per gram, a free water content of about 6.3%, a bound water content of about 4.5%, a $SiO_2$ content of 87.5%, a CaO content of 0.75%, a content of other metal oxides ($R_2O_3$) of about 0.95%, and pH of about 6.8; (b) the amount of iron compound/clay mixture used is 8.4 parts; (c) the amount of kerosene/mercaptan mixture used is 60.5 parts; and (d) the amount peptizer mixed with the rubber is 0.332 part.

The rubber is very effectively plasticized by the Example 3 peptizer as shown by the torque values given in Table I. If a particular decrease in the amount of plasticizing obtained within a particular mixing time is desired, this can easily be accomplished by a few simple experiments to determine the required reduction in the amount of xylyl mercaptan, iron compound, and/or peptizer composition, with or without a reduction in the rubber mixing temperature. One skilled in the art, after reading the present disclosure, will find that the novel composition makes it easy to regulate the rate and degree of plasticizing to the extent needed to obtain reproducible results in a wide variety of applications while also providing the other advantages mentioned above.

EXAMPLE 4

A peptizer is prepared by (1) placing in a ribbon blender 30 parts of "Micro-Cel" E; (2) while operating the ribbon blender and agitating its contents, gradually adding 70 parts of a 30:70 mixture of kerosene and xylyl mercaptan; and (3) continuing to operate the blender until the resulting peptizer composition is uniformly mixed.

The resulting non-dusty free-flowing particulate peptizer is substantially free of unpleasant odor when evaluated as described in Example 1; and it contains none of the iron compound or clay used in Example 1. A small amount (0.8 part) of the peptizer is mixed with natural rubber in the manner described in Example 2 except the mixing temperature is 149° C. As shown by the torque values given in Table I, the rubber is successfully plasticized by the Example 4 peptizer. The plasticized rubber is useful in the manufacture of rubber products by conventional methods.

EXAMPLE 5

A smaller amount of the Example 4 peptizer (0.40 part) than used in Example 4 is mixed with natural rubber in the manner described in Example 4. As shown in Table I, the rubber is plasticized less in a given period than in Example 4; this rate of plasticizing is desirable in certain applications.

EXAMPLE 6

A still smaller amount of the Example 4 peptizer (0.29 part) is mixed with natural rubber in the manner described in Example 4. As shown in Table I, the rubber is plasticized less in a given period than in Example 5; this rate of plasticizing is desirable in certain applications.

EXAMPLE 7

In another embodiment of the invention, a slower but useful plasticizing rate is obtained by repeating Example 4 except: the "Micro-Cel" E in step 1 is replaced with 34 parts of the "Hi Sil" 233 used in Example 3; the amount of kerosene/mercaptan mixture used in step 2 is 66 parts; the amount of peptizer used is 0.608 part and the rubber mixing temperature is 121° C. The 15 minute torque value is 750.

EXAMPLES 8–10

Other useful embodiments of the invention are carried out as follows:

In Example 8, a peptizer is prepared in the manner described in Example 3 except: (a) the amount of "Hi Sil" 233 used is 28 parts; (b) the amount of the iron compound/clay mixture used is 12 parts; and (c) the amount of the kerosene/mercaptan mixture used is 60 parts. This peptizer has desirable utility and odor characteristics similar to those of the Example 1 product. This peptizer (0.35 part) is mixed with polyisoprene synthetic rubber ("Natsyn" 400 from Goodyear) in the manner described in Example 2. The 15 minute torque value is 670. When the peptizer is omitted, the polyisoprene has a 15 minute torque value of 1005.

In Example 9, the Example 8 peptizer (0.88 part) is mixed with polybutadiene synthetic rubber (Cis 4–1203 from Phillips Petroleum Co.) in the manner described in Example 2. The 15 minute torque value is 760. When the peptizer is omitted, the polybutadiene has a 15 minute torque value of 1205.

In Example 10, the Example 8 peptizer (2.64 parts) is mixed with styrene/butadiene copolymer synthetic rubber (SBR–1500, bound styrene content about 23%) in the manner described in Example 2. The 15 minute torque value is 720. When the peptizer is omitted, the copolymer has a 15 minute torque value of 130.

I claim:

1. A pourable particulate composition useful for plasticizing rubber comprising:
   (A) fine particles of a substance selected from the group: hydrated silica and hydrated calcium silicate, said particles having an average diameter of about 0.005–2.5 microns and a surface area of about 40–400 square meters per gram, and
   (B) xylyl mercaptan attached to said particles, the weight ratio of component B to component A being about 35:65 to 70:30, said composition being substantially free of mercaptan odor.

2. A composition according to claim 1 having uniformly dispersed therein:
   (C) about 0.1–2.0% of iron phthalocyanine based on the combined weight of components A, B and C.

3. A composition according to claim 2 wherein the component C content of the composition is about 1.0–1.7%.

4. A composition according to claim 2 wherein component C is in the form of particles having an average diameter of about 0.75–1.25 microns.

5. A composition according to claim 2 having uniformly dispersed therein about 1–15% of clay based on the weight of the composition.

6. A composition according to claim 2 having uniformly dispersed therein:
(D) an inert liquid diluent which is miscible with component B, and undergoes no harmful reaction with components A, B and C, the weight ratio of component D to component B being about 5:95 to 40:60.

7. A composition according to claim 6 wherein component D is kerosene.

8. A composition according to claim 6 wherein component D is a light petroleum oil type of rubber-processing oil.

References Cited
UNITED STATES PATENTS

| | | | |
|---|---|---|---|
| 2,447,732 | 8/1948 | Campbell et al. | 252—364 X |
| 3,036,980 | 5/1962 | Dunham, Jr. et al. | 252—259.5 X |
| 3,384,680 | 5/1968 | Lussow | 252—259.5 X |
| 3,501,348 | 3/1970 | Frischknecht | 252—364 X |

RICHARD D. LOVERING, Primary Examiner

U.S. Cl. X.R.

51—308; 106—308 Q; 117—100 S; 252—259.5, 364; 260—41.5 A, 766